United States Patent [19]
Watanabe et al.

[11] Patent Number: 5,182,734
[45] Date of Patent: Jan. 26, 1993

[54] MAGNETO-OPTICAL RECORDING APPARATUS WITH PULSE DRIVEN LIGHT BEAM AND VARIABLE DELAY OF MAGNETIC FIELD REVERSALS BASED ON RECORDING MEDIUM CHARACTERISTICS

[75] Inventors: Tetsu Watanabe, Tokyo; Tetsuji Kawashima; Goro Fujita, both of Kanagawa, all of Japan

[73] Assignee: Sony Corporation, Tokyo, Japan

[21] Appl. No.: 465,123

[22] PCT Filed: Jun. 19, 1989

[86] PCT No.: PCT/JP89/00612
§ 371 Date: Feb. 20, 1990
§ 102(e) Date: Feb. 20, 1990

[87] PCT Pub. No.: WO89/12889
PCT Pub. Date: Dec. 28, 1989

[30] Foreign Application Priority Data
Jun. 24, 1988 [JP] Japan .................. 63-157729
Oct. 18, 1988 [JP] Japan .................. 63-263503

[51] Int. Cl.⁵ .................. G11B 11/10; G11B 11/12; G11B 13/04
[52] U.S. Cl. .................. 369/13; 360/59; 360/114
[58] Field of Search .................. 369/13, 14, 110; 360/114, 59, 66; 365/122

[56] References Cited
U.S. PATENT DOCUMENTS
4,991,158 2/1991 Wada .................. 369/13
5,091,897 2/1992 Otokawa et al. .................. 360/59

FOREIGN PATENT DOCUMENTS
0275323 7/1988 European Pat. Off. .
59-81671 5/1984 Japan .................. 360/114
61-214266 9/1986 Japan .
61-243974 10/1986 Japan .................. 360/114
61-276103 12/1986 Japan .................. 369/13
62-154250 7/1987 Japan .
62-285258 12/1987 Japan .
63-108539 5/1988 Japan .................. 360/114
63-241740 10/1988 Japan .
1-37745 2/1989 Japan .................. 369/13
1-112551 5/1989 Japan .

Primary Examiner—Hoa Nguyen
Attorney, Agent, or Firm—Alvin Sinderbrand; William S. Frommer

[57] ABSTRACT

In a magneto-optical recording apparatus, in which light spots are sequentially formed on a magneto-optical disk at the timing of a predetermined reference clock signal while a modulating magnetic field, which is reversed in polarity as a function of record data in synchronism with the reference clock signals, is applied to the disk for magnetically recording the record data thereon; the timing of polarity reversal of the modulating magnetic field with respect to the reference clock signal is delayed as a function of the magnetic and/or temperature characteristics of the magneto-optical disk to permit a magnetized domain to be formed at the correct position with respect to the timing of the reference clock signal. The intensity and/or duration of intermittent energizing of the light beam is controlled as a function of the ambient temperature of the magneto-optical disk and/or the radial sweeping position of the light spot to permit each magnetized domain to be formed at the correct position with respect to the timing of the reference clock signal.

9 Claims, 9 Drawing Sheets

MAGNETO-OPTICAL RECORDING APPARATUS WITH PULSE DRIVEN LIGHT BEAM AND VARIABLE DELAY OF MAGNETIC FIELD REVERSALS BASED ON RECORDING MEDIUM CHARACTERISTICS

BACKGROUND OF THE INVENTION

1. Field of the Invention

This invention relates to a magneto-optical recording apparatus and may be advantageously applied to a magneto-optical recording apparatus in which record data, for example, may be recorded by overwriting on a magneto-optical disk.

2. Description of the Prior Art

Heretofore, in a magneto-optical recording apparatus, desired record data have been magnetically recorded by taking advantage of the phenomenon that magnetic properties of the magneto-optical disk are changed significantly on both sides of the Curie temperature Tc, which is used as the boundary temperature.

Thus, as shown in FIG. 1, the coercive force Hc of the vertical magnetization film of a magneto-optical disk is lowered abruptly at the Curie temperature.

Hence, the vertical magnetization film is warmed once to higher than the Curie temperature Tc and then lowered to a temperature lower than the Curie temperature Tc by application of an external magnetic field so as to be oriented in the direction of the external magnetic field.

Based on this principle of magnetization, a magneto-optical recording apparatus is so designed and constructed that a light spot sweeps the magneto-optical disk by continuously irradiating the magnetic-optical disk with a light beam to warm up a predetermined region of the magneto-optical disk to higher than the Curie temperature Tc, at the same time that a modulating magnetic field having its polarity reversed at the timing of a predetermined reference clock signal as a function of data to be recorded, is applied with the use of a magnetic head.

In this manner, the region irradiated by the light spot is warmed once to a temperature higher than the Curie temperature Tc and cooled spontaneously so as to be oriented along the direction of the modulating magnetic field applied to the region when crossing of the Curie temperature Tc occurs.

Thus, even when a pattern of magnetization has been formed previously, micro-regions oriented in accordance with the modulating magnetic field (referred to hereinafter as magnetized domains) are formed sequentially along the sweeping path of the light spot at the period of the clock signals to cause desired record data to be recorded in an overwriting manner.

However, when the region irradiated by a light beam is cooled spontaneously after the irradiation, the time which elapses from sweeping by the light spot until spontaneous cooling to lower than the Curie temperature Tc changes as a function of the temperature characteristics of the magneto-optical disk itself, so that a problem arises in that the magnetized domain formation position changes with respect to the reference clock signal as a function of temperature characteristics of the magneto-optical disk itself.

Hence, when forming reference clock signals from servo patterns previously formed on the magneto-optical disk, the magnetized domain forming position with respect to the servo patterns changes so as to render it difficult to reproduce record data on the basis of the servo patterns. Thus, phase shift or deviation occurs in the signal reproduced from the servo patterns.

In addition, for reliably detecting changes in orientation between adjoining magnetized domains and reliably reproducing the record data, it is necessary to form magnetization patterns having an orientation which is reversed abruptly between the adjoining magnetized domains.

Thus, when the light beam is irradiated continuously, it becomes necessary to provide a circuit for forming the modulating magnetic field which includes a driving circuit having excellent frequency characteristics, so as to enable abrupt polarity inversion of the modulating magnetic field, which complicates the structure on the whole correspondingly.

OBJECTS AND SUMMARY OF THE INVENTION

In view of the foregoing, it is an object of the present invention to provide a magneto-optical recording apparatus in which light spots are sequentially formed at the timing of a predetermined reference clock signal, and a predetermined modulating magnetic field is applied which is reversed in polarity as a function of data to be recorded in synchronism with the reference clock signals, thereby to magnetically record said data on said magneto-optical disk, and wherein a magnetized domain can be formed at the correct position with respect to the timing of the reference clock signal. It is another object of the present invention to provide such a magneto-optical recording apparatus having a simplified structure as a whole.

In accordance with an object of this invention, a magneto-optical recording apparatus for recording information onto a magneto-optical recording medium, comprises optical head means including light generating means for directing a light beam against the recording medium and thereby irradiating the latter at a respective light beam spot scanning the recording medium, and detection means for detecting light reflected from the recording medium at the light beam spot; clock signal generating means for generating a predetermined reference clock signal supplied to the light generating means for causing intermittent energizing of the light beam in a pulse driving mode thereof so that the irradiating of the recording medium occurs at light beam spots disposed one after the other at a timing determined by the reference clock signal; magnetic field generating means for generating magnetic fields acting on the recording medium adjacent a location on the latter at which the light beam is directed; magnetic field modulating means receiving the reference clock signal and information data to be recorded for providing a record signal undergoing polarity reversals in timed relation to the reference clock signal in accordance with the information data; delay means through which the record signal is supplied to the magnetic filed generating means for causing reversal of magnetic polarity of the magnetic fields in accordance with the record signal, and which has a variable delay time; and control means for providing a control signal corresponding to at least one of magnetic and temperature characteristics of the recording medium and which is applied to the delay means for varying the delay time and thereby controlling timing of the reversal of the magnetic polarity of the magnetic fields relative to the reference clock signal. By delaying the timing of polarity inversion of the modulating magnetic field with respect to the reference clock signal by a predetermined amount in this manner for a particular magneto-optical disk, the region irradiated by the light beam may be oriented by the necessary magnetic field reliably so that the magnetized domain may be formed at a correct position with respect to the timing of the reference clock signal with a simplified overall structure.

In accordance with another aspect of this invention, a magneto-optical recording apparatus as described above further comprises temperature sensing means positioned near the recording medium for detecting the ambient temperature thereof and providing a temperature indicating signal to the control means and the control means provides a second control signal to the light generating means in response to the temperature indicating signal for correspondingly controlling the amount of light in each of the light beam spots at which the recording medium is irradiated in the pulse driving mode.

By controlling the light beam as a function of the disk temperature, magnetized domains can be formed at the correct position despite changes in the ambient temperature.

In accordance with a further aspect of this invention, in a magneto-optical recording apparatus as described above and in which the recording medium is a rotated record disk, the optical head means is displaced radially in respect to the rotated disk for varying the radial position on the disk at which the light beam spot scans the latter; the magneto-optical recording apparatus further comprises position sensing means for detecting the radial position and providing a position indicating signal to the control means, and the control means providing a second control signal to the light generating means in response to the position indicating signal for correspondingly controlling the amount of light in each of the light beam spots at which the record disk is irradiated in the pulse driving mode.

By controlling the light beam, magnetized domains can be formed at the correct position as a function of the sweeping position while the disk is rotated at a constant angular velocity, at all radical positions.

DETAILED DESCRIPTION OF PREFERRED EMBODIMENTS OF THE INVENTION

Figure 1:
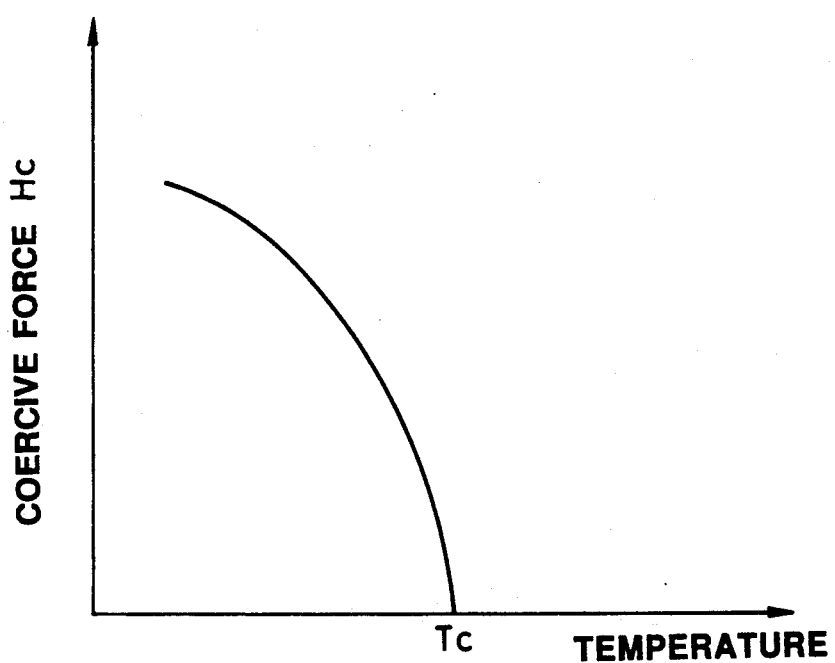
FIG. 1 shows a characteristic curve showing general magnetization of a magneto-optical disk.

An embodiment of the present invention will be explained in detail by referring to the drawings.

Figure 2:
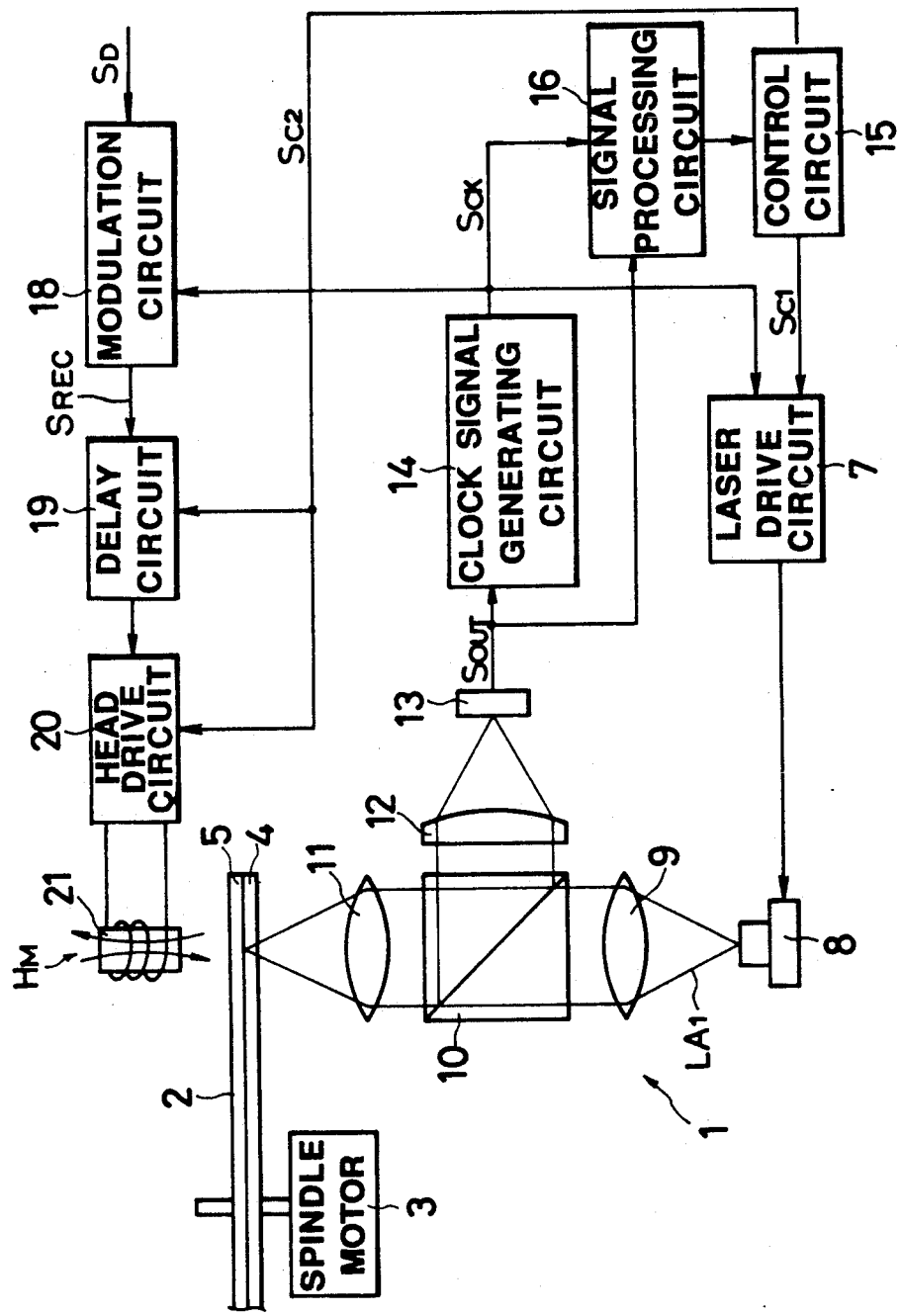
FIG. 2 is a block diagram showing the structure of a first embodiment of the magneto-optical recording apparatus according to the present invention.

In the block diagram of FIG. 2, magneto-optical recording apparatus 13 according to an embodiment of the present invention is shown to include a magneto-optical disk 2 comprised of a transparent protective base plate 4 of, e.g., polycarbonate or glass on which a vertical magnetization film 5 is applied, and which is driven by a spindle motor 3 so as to be rotated at a predetermined rotational speed.

On the magneto-optical disk 2, servo patterns of a so-called sample format are formed in servo regions provided at a predetermined angular interval, and reference clock signals for writing and reading record data may be obtained on the basis of reproduced signals obtained from the servo patterns of the sample format.

The magneto-optical disk 2 has a control track on its innermost periphery and information, such as magnetic and temperature characteristics of the magneto-optical disk 2, is previously recorded in the control track.

Figure 3:
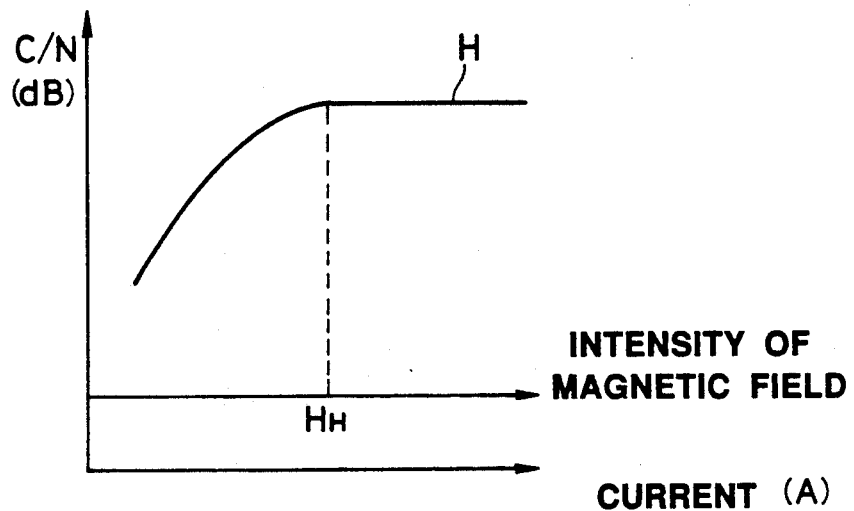
FIG. 3 shows a characteristic curve showing typical characteristics of the magneto-optical disk employed in the first embodiment.

For example, the magnetic-optical disk 2 may have characteristics, such as are shown in FIG. 3, in which, when the current supplied to the magnetic head is increased so that the external magnetic field becomes stronger, the C/N ratio of the reproduced signal is improved until it reaches saturation. Data representing the intensity of the magnetic field at the saturation point $H_H$ are recorded in the control track as one of the magnetic characteristics of the side 2. The intensity of the magnetic filed at the saturation point $H_H$ is referred to hereinafter as the necessary magnetic field.

On the magneto-optical disk 2, there are also recorded as the temperature characteristic of the magneto-optical disk 2, data representing the time during which the temperature of an area irradiated with a light spot of a predetermined light volume rises to the Curie temperature Tc when the light spot is irradiated for a predetermined time in synchronism with reference clock signals on the magneto-optical disk 2 which is maintained at a predetermined reference temperature, peak temperature data and data representing the time during which the temperature falls from the peak temperature to the Curie temperature.

A semiconductor laser element 8, from which a light beam $LA_1$ is emitted so as to irradiate the magneto-optical disk 2, is driven by a laser driving circuit 7. The circuit 7 operates in accordance with a control signal $S_{C1}$ supplied from a control circuit 15 to switch the volume of the light of the light beam $LA_1$ and to switch the driving state from continuous driving to pulse driving. When in the pulse driving state, the laser driving circuit 7 operates to drive the semiconductor laser element 8 intermittently, as shown in B in FIG. 5, in synchronism with the reference clock signal $S_{CK}$, shown at A in FIG. 5, and which is supplied from a clock signal generator 14.

With the above magneto-optical recording apparatus 1, the light beam $LA_1$ exiting from the semiconductor laser element 8 is converged on the magneto-optical disk 2, by way of a collimator lens 9, light polarizing beam splitter 10 and an objective lens 11, and the light reflected from the magneto-optical disk 2 is transmitted to a photo detector 13 by way of the objective lens 11, beam splitter 10 and a condenser lens 12.

The clock signal generator 14 receives reproduced signals $S_{OUT}$, produced at the photo detector 13, and, on the basis of the reproduced signal from the servo regions, outputs the reference clock signal $S_{CK}$ for writing or reading out record data.

The control circuit 15 also receives the data concerning magnetic and temperature characteristics of the magneto-optical disk 2, obtained upon demodulating the reproduced signal $S_{OUT}$ at a signal processing circuit 16 and, on the basis of these data concerning the magnetic and temperature characteristics, performs switching control of the operations of the laser driving circuit 7, a delay circuit 19 and a head driving circuit 20.

During the time corresponding to traversal of a servo region of the magneto-optical disk 2, the control circuit 15 outputs the control signal $S_{C1}$ to the laser driving circuit 7 in the recording mode so a to drive the semiconductor laser element 8 continuously. The laser element 8 continuously operates to irradiate the servo region with the light beam $LA_1$, allowing the clock signal generator 14 to derive the tracking error signal as well as the reference clock signal $S_{CK}$ from the servo region, and allowing the control circuit 15 to perform a control operation of actuating a tracking servo system, not shown, to effect tracking control of the light spot. During the time corresponding to traversal of other than a servo region, the control signal $S_{C1}$ from the control circuit 15 switches the laser drive circuit 7 to the pulse driving mode and also controls the intensity or light volume of the light beam $LA_1$ emitted by the semiconductor laser element 8. During pulse driving, the light beam LA1 is emitted from the semiconductor laser element 8 during a predetermined period $T_1$ starting with rising of the reference clock signal, as shown at B in FIG. 5. Thus, the control circuit 15 controls the intermittent irradiating of the regions other than the servo regions with the light beam LA.

Figure 4:
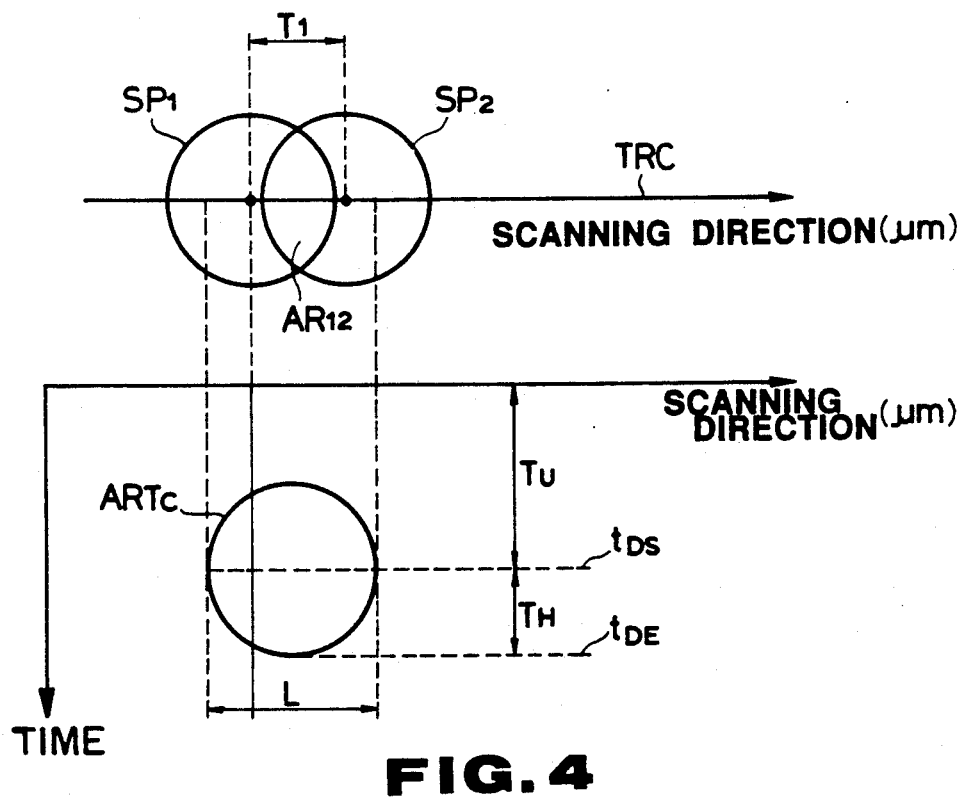
FIG. 4 is a diagrammatic view showing the region at higher than the Curie temperature on the sweeping path by the light spot in the first embodiment.

During the intermittent irradiating, the relation between the region ARTc in which the temperature is higher than the Curie temperature Tc and the times required for increasing the temperature to such level and then spontaneously decreasing the temperature below $T_C$ are represented, as shown on FIG. 4, in which light spots $SP_1$ and $SP_2$ are formed on the center TRC of the travel path of the light beam $LA_1$ formed at a time $t_1$ of initiation of irradiation by the light beam $LA_1$ and a time $t_2$ of termination of irradiation, respectively, with the direction of scanning by the light spot represented on a horizontal axis. The area ARTc having length L is that in which the temperature is increased to a temperature greater than the Curie temperature $t_C$ due to the irradiation occurring which the light spot waves from the position shown at $SP_1$ to the position shown at $SP_2$.

If the time $t_1$ of the start of irradiation of the light beam $LA_1$ is taken as the reference, a region $AR_{12}$ in which the light spot $SP_1$ is overlapped with the light spot $SP_2$ is continuously irradiated with a light beam $LA_1$ during the predetermined time $T_1$. Therefore, the temperature in the region $AR_{12}$ is quickly raised to higher than the Curie temperature Tc, and requires a relatively long time for the temperature to fall below the Curie temperature Tc after irradiation by the light beam $LA_1$ is interrupted.

Conversely, in portions of the region ARTc in which the light spots $SP_1$ and $SP_2$ are not overlapped with each other, the further the portion is spaced away from the area $AR_{12}$, the longer is the time required for the temperature therein to increase above the Curie temperature and the shorter is the time required for the temperature to decrease below the Curie temperature.

It may be seen from above that, for positively orienting the region $ART_C$ of length L by the necessary magnetic field $H_H$, is suffices to impress the necessary magnetic field $H_H$ starting at a time $t_{DS}$, at which the temperature of any portion of the region $ART_C$ decreases lower than the Curie temperature Tc, and to maintain the intensity of the modulation magnetic field at higher than the necessary magnetic field $H_H$ during the time period $T_H$ from the above time $t_{DS}$ until the time $t_{DE}$, at which the temperature at all points within the region $ART_C$ of length L falls to lower than the Curie temperature Tc.

In the following, the time period from the time $t_1$ of the start of irradiation by the light beam $LA_1$ until the time $t_{DS}$, Which is the start of temperature decrease of any portion of the region ARTc to lower than the Curie temperature Tc is termed the rise time $T_U$, whereas the period from the above time $t_{DS}$ until the time $t_{DE}$, at which the temperature in all of the region ARTc of length L falls to lower than the Curie temperature Tc, is termed the holding time $T_H$.

Although the rise time $T_U$ and the holding time $T_H$ differ from one magneto-optical disk to another, depending on the magnetic and temperature characteristics thereof, the region irradiated by the light beam $LA_1$ can be positively oriented by the necessary magnetic field $H_H$ by variably controlling the time period during which the modulating magnetic field rises to the necessary magnetic field $H_H$ and the time period during which the modulating magnetic field falls from the necessary magnetic field $H_H$, as a function of the magnetic and temperature characteristics of the magneto-optical disk $LA_1$.

As a result, the light beam $LA_1$ is intermittently energized at the timing of the reference clock signal $S_{CK}$, so that a magnetized domain can be formed which is oriented in the correct position by the necessary magnetic field $H_H$. A series of consecutive magnetized domains can be formed at the period of the reference clock signals $S_{CK}$ obtained from the servo patterns of the sample format recorded on the magneto-optical disk.

In addition to the problem caused by inherent differences of the magnetic and temperature characteristics of the magneto-optical disk, there arises a problem in that, when the light beam is energized continuously, the temperature in the near-by regions of the magnetized domains is changed markedly by the light beam irradiation, in such a manner as to affect the position of the magnetized domain which will be subsequently formed.

As described above, temperature changes in the near-by region of the magnetized domains when the light beam $LA_1$ is intermittently emitted from the semiconductor laser element 8 can be reduced relative to when the light beam is emitted continuously, so that deflection of the magnetized domain forming position caused by temperature changes can be substantially prevented from occurring, while the semiconductor laser element 8 may be improved in reliability simultaneously.

Thus, in the embodiment being presently described the rise time $T_U$ and the holding time $T_H$ of the magneto-optical disk 2 may be derived on the basis of the magnetic and temperature characteristics of the magnetic-optical disk 2 recorded on the control track and the timing of the modulating magnetic field may thereby be controlled variably with respect to the reference clock signal $S_{CK}$.

Figure 6:
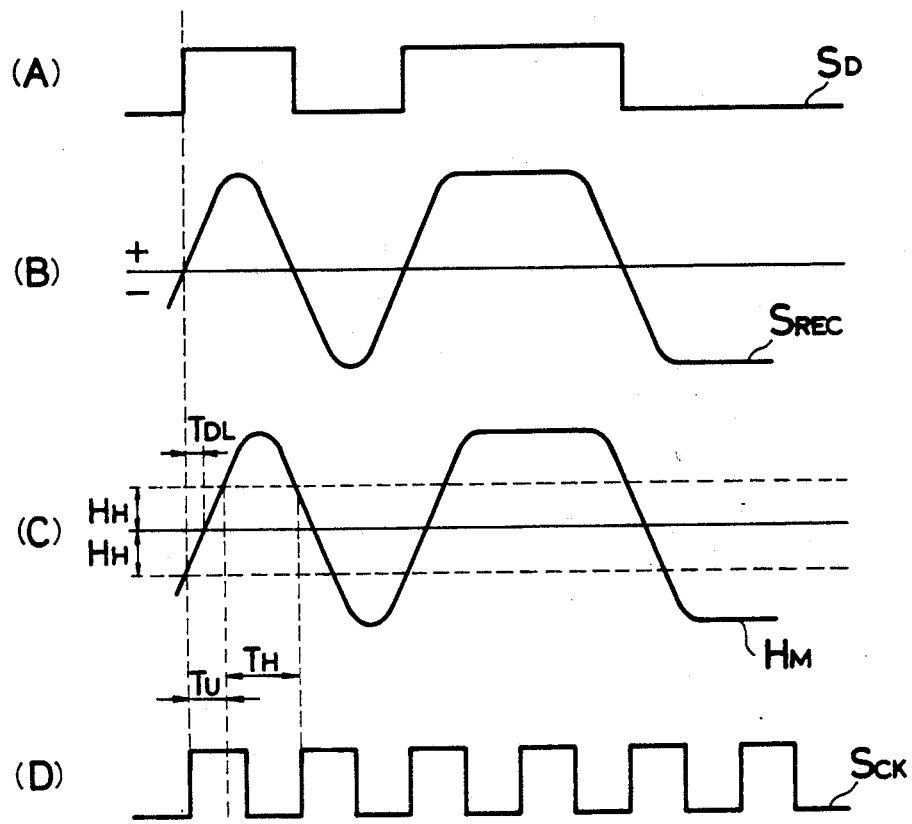
FIG. 6 is a signal waveform diagram showing the relation of the modulating magnetic field with the reference clock signal in the first embodiment.

More particularly, in the present embodiment, the modulating circuit 18 receives a record data signal $S_D$ as shown for example at A in FIG. 6 to form a record signal $S_{REC}$, inverted in polarity at a predetermined gradient responsive to the signal level of the record data signal $S_D$, and outputs the record signal $S_{REC}$ to the head driving circuit 20 by way of the delay circuit 19.

The control circuit 15 outputs a control signal $S_{C2}$ to the delay circuit 19 and to the head driving circuit 20 to variably control the delay time $T_{DL}$ of the delay circuit 19 and the amplification factor of the head driving circuit 20.

Thus, by variably controlling the amplification factor of the head driving circuit 20, the modulating magnetic field $H_M$ formed by the magnetic head 21 is set so as to be higher than the necessary magnetic field $H_H$ during a time longer than the holding time $T_H$.

By variably controlling the delay time $T_{DL}$ of the delay circuit 19, the modulating magnetic field $H_M$ is caused to increase to above the necessary magnetic field $H_H$ with a delay equal to the rise time $T_U$ from the reference clock signal $S_{CK}$ shown at D in FIG. 6.

Figure 5:
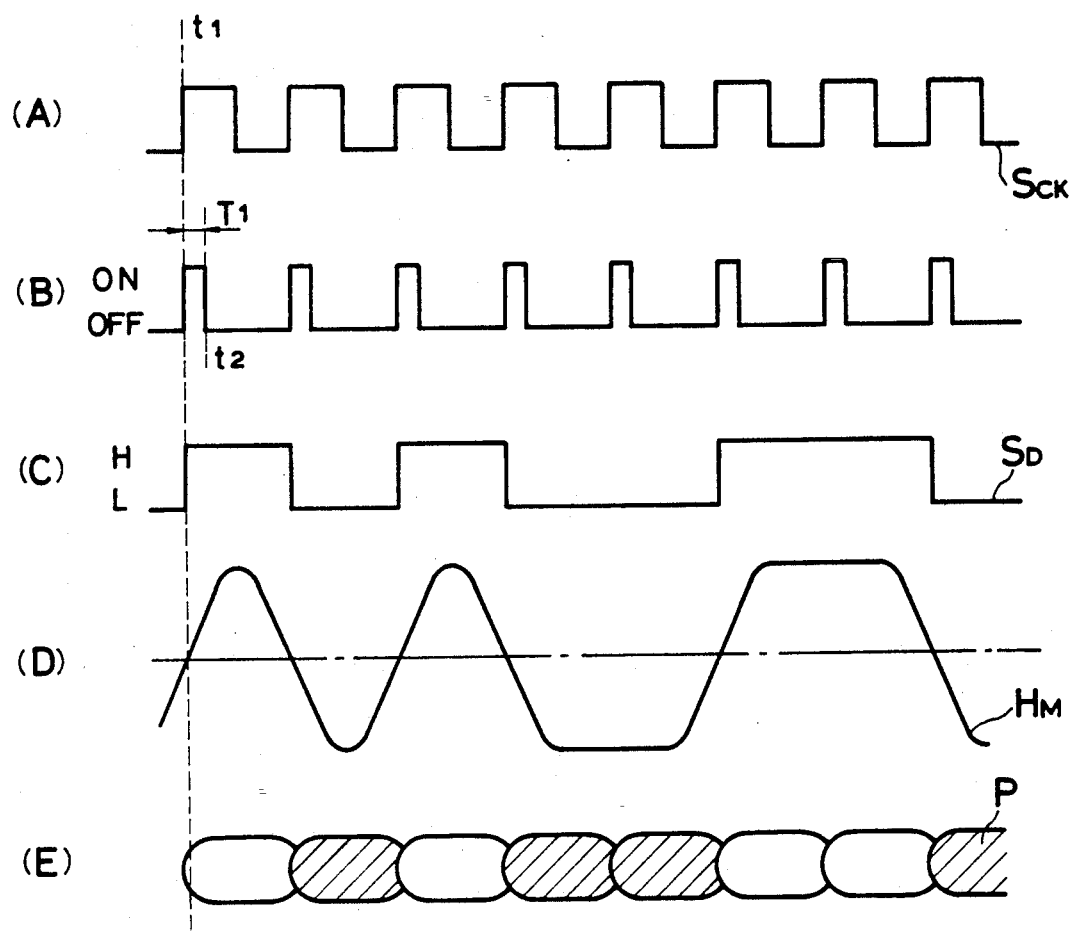
FIG. 5 shows signal waveform diagrams for illustrating the operation of the above first embodiment.

In this manner, desired magnetized domains may be sequentially formed along the scanning path of the light spot, so that magnetized domains P shown at E in FIG. 5 may be formed one after another on the scanning path of the light spot by the modulating magnetic field $H_M$, shown at D in FIG. 5, associated with the record data signals $S_D$ shown at C in FIG. 5.

In the present embodiment, it suffices to raise the modulating magnetic field $H_M$ to higher than the necessary magnetic field $H_H$ with a delay equal to the rise time $T_U$ from the reference clock signal $S_{CK}$ and to maintain the modulating magnetic field $H_M$ at higher than the necessary magnetic field $H_H$ only during a time longer than the holding time $T_H$. In this manner, a magneto-optical recording apparatus may be obtained which is simpler in construction as compared with the case in which the polarity of the modulating magnetic field is changed abruptly. Hence, by selecting the magnetic head driving circuit 20 so as to have correspondingly higher frequency characteristics, a magneto-optical recording apparatus may be provided with a recording density which is markedly higher than that obtained with the conventional apparatus.

In the above arrangement, the light beam $LA_1$ is intermittently emitted from the laser 8 so as to irradiate the magneto-optical disk 2 at the timing of the reference clock signal $S_{CK}$ obtained from the servo regions of the magneto-optical disk 2, so that the light spot is formed intermittently on the magneto-optical disk 2.

Moreover, the delay time $T_{DL}$ of the delay circuit 19 and the amplification factor of the head driving circuit 20 are controlled variably on the basis of the magnetic and temperature characteristics of the disk 2, recorded on its control track, so that the modulating magnetic field $H_M$ rises to a level higher than the necessary magnetic field $H_H$ with a delay equal to the rise time $T_U$ relative to the reference clock signal $S_{CK}$ and then falls to lower than the necessary magnetic field $H_H$ after lapse of the holding time $T_H$.

Thus the regions irradiated by the optical beam $LA_1$ are oriented by the modulating magnetic field $H_M$ higher than the necessary magnetic field $H_H$ so that the magnetized domains P may be formed, which are oriented at the correct positions by the modulating magnetic field $H_M$ higher than the necessary magnetic field $H_H$, at the timing of the reference clock signal $S_{CK}$.

In the above arrangement, the delay time $T_{DL}$ of the delay circuit 19 and the amplification factor of the head driving circuit 20 may be variably controlled from disk to disk on the basis of the magnetic and temperature characteristics of the magneto-optical disk to derive the modulating magnetic field $H_M$ which rises to higher than the necessary magnetic field $H_H$ with a delay equal to the rise time $T_U$ and falls to lower than the necessary magnetic field $H_H$ after lapse of the holding time $T_H$ so that the regions irradiated by the light beam may be oriented reliably with an intensity higher than the necessary magnetic field $H_H$.

Hence, With the first embodiment having a simple arrangement on the whole, magnetized domains P can be formed at the correct positions at the timing of the reference clock signal $S_{CK}$.

Figure 7:
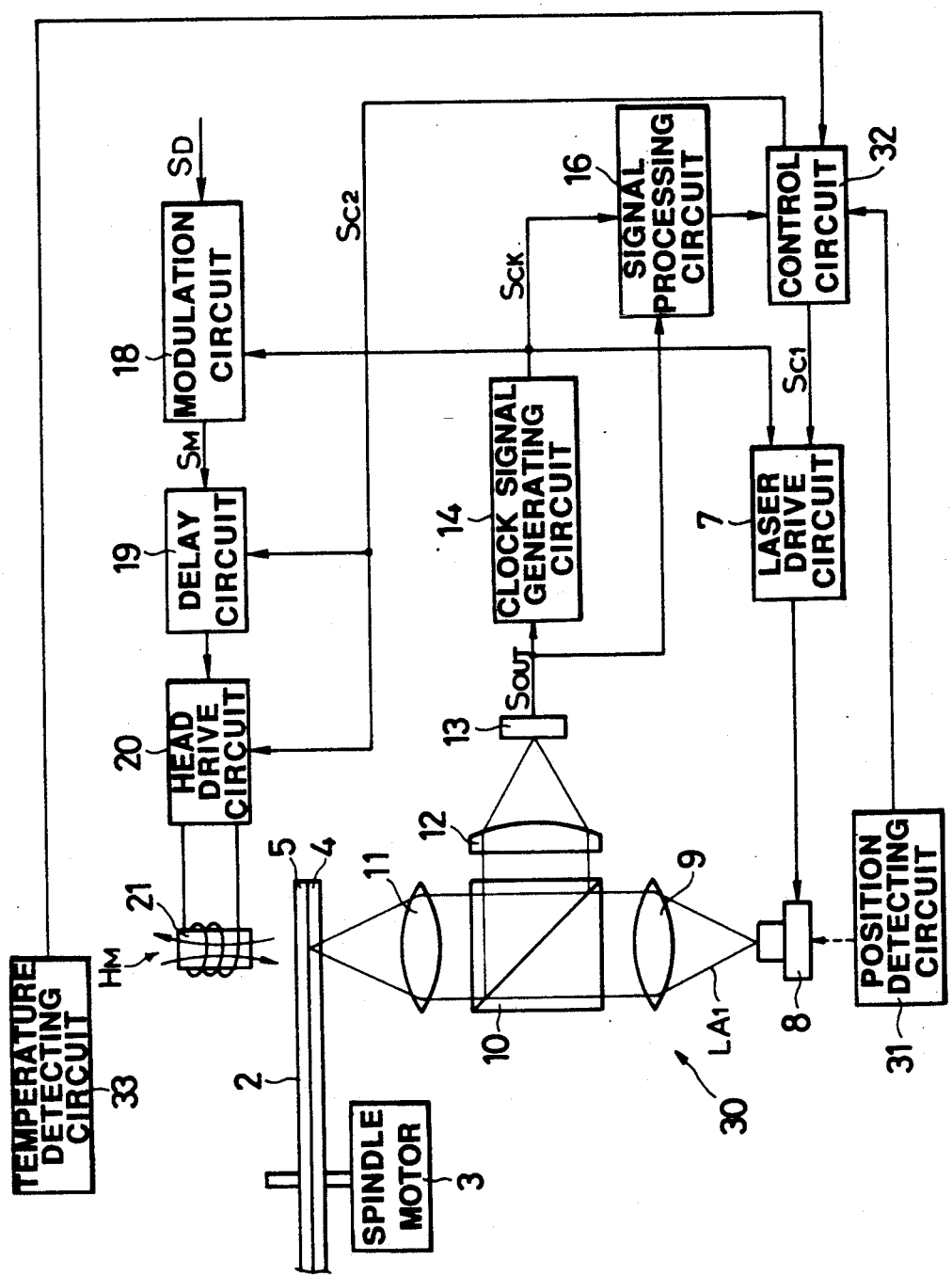
FIG. 7 is a block diagram showing the structure of the second embodiment of the magneto-optical recording apparatus according to the present invention.

Referring to the block diagram of FIG. 7 showing the arrangement of a magneto-optical recording apparatus according to a second embodiment of the present invention, the numeral 30 generally denotes a magneto-optical recording apparatus which is adapted to delay the modulating magnetic field depending on a particular magneto-optical disk and to control the light beam depending on the disk temperature and the sweeping position of the light position.

Figure 8:
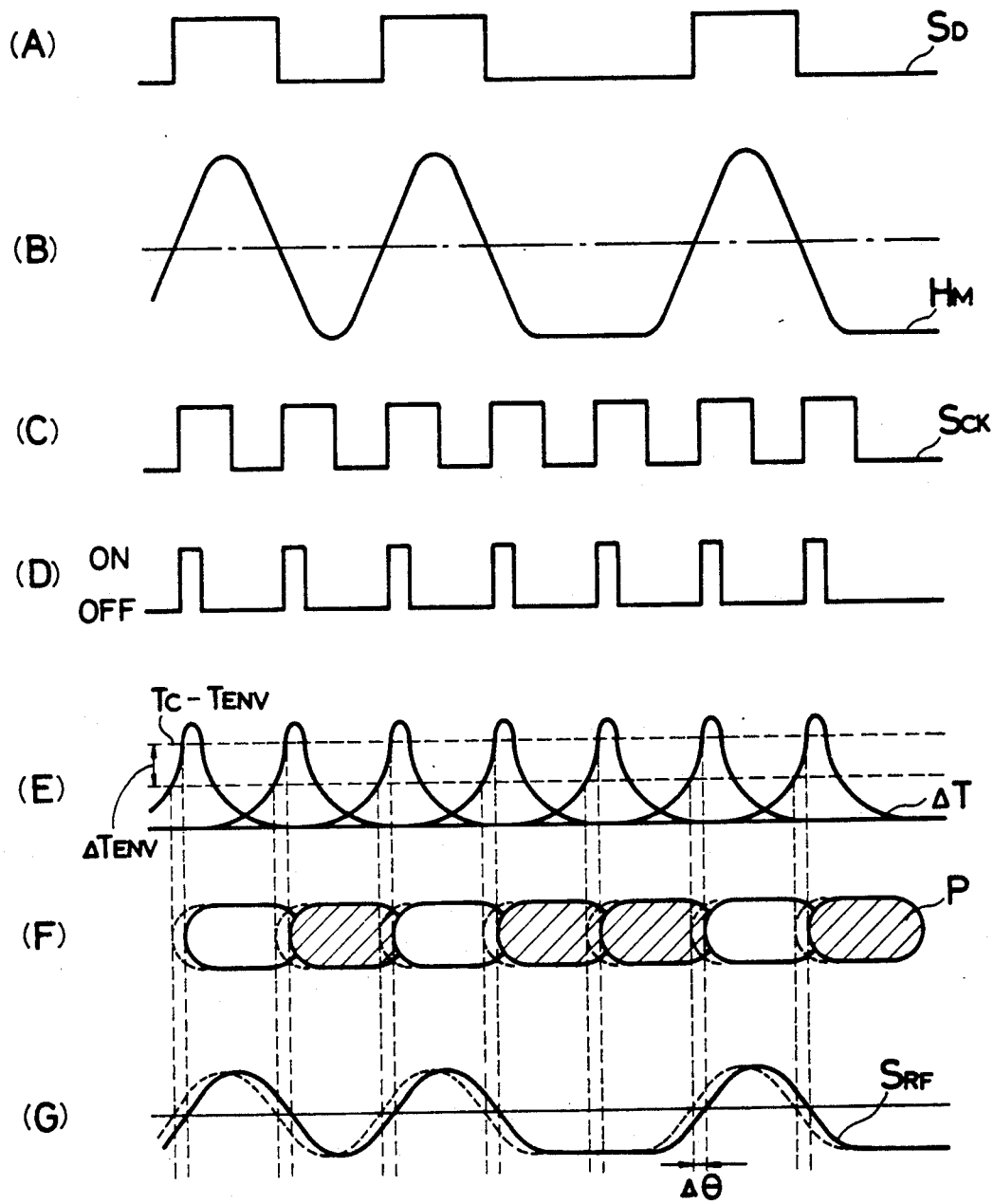
FIG. 8 shows signal waveform diagrams for illustrating the operation of the second embodiment.

Thus, when the light beam $LA_1$ is emitted intermittently for irradiating the disk, as shown at D in FIG. 8, in synchronism with the reference clock signal $S_{CK}$ shown at C in FIG. 8, while simultaneously applying to the disk the modulating magnetic field $H_M$ shown at B in FIG. 8 which is reversed in polarity as a function of the record data signal $S_D$ shown at A in FIG. 8, the temperature at an area of the disk irradiated with the light beam $LA_1$ rises from the ambient temperature of the disk and then falls to the ambient temperature, so that the regions irradiated with the light beam $LA_1$ undergo a temperature change $\Delta T$ as shown at E in FIG. 8.

Thus there arises a problem that, when the temperature change $\Delta T$ exceeds $T_C - T_{ENV}$, wherein $T_{ENV}$ denotes the ambient temperature of the disk, the magnetized domain P oriented by the modulating magnetic field $H_M$ is formed, as shown at F in FIG. 8 and, if the ambient temperature $T_{ENV}$ is changed, the position of magnetized domain formation is changed with changes $\Delta T_{ENV}$ in the ambient temperature $T_{ENV}$.

For example, when the ambient temperature $T_{ENV}$ is raised by $\Delta T_{ENV}$ and the disk temperature is raised correspondingly, the disk temperature may rise to the Curie temperature with a lesser temperature increase $\Delta T$, so that, as shown by a broken line at F in FIG. 8, the position of magnetized domain formation is shifted in an opposite direction to the sweeping direction of the light spot.

As a result, the magnetized domain cannot be formed at the correct position, such that, when the ambient temperature $T_{ENV}$ is raised, the reproduced signal $S_{RF}$ is advanced in phase by $\Delta\theta$ as shown at G in FIG. 8.

Moreover, when the magneto-optical disk is rotated at a constant angular velocity, the linear velocity at the inner periphery of the disk is lower than that at the outer periphery of the disk so that the irradiation intensity of the light beam per unit area is increased and the rise time $T_U$ correspondingly reduced.

Figure 9:
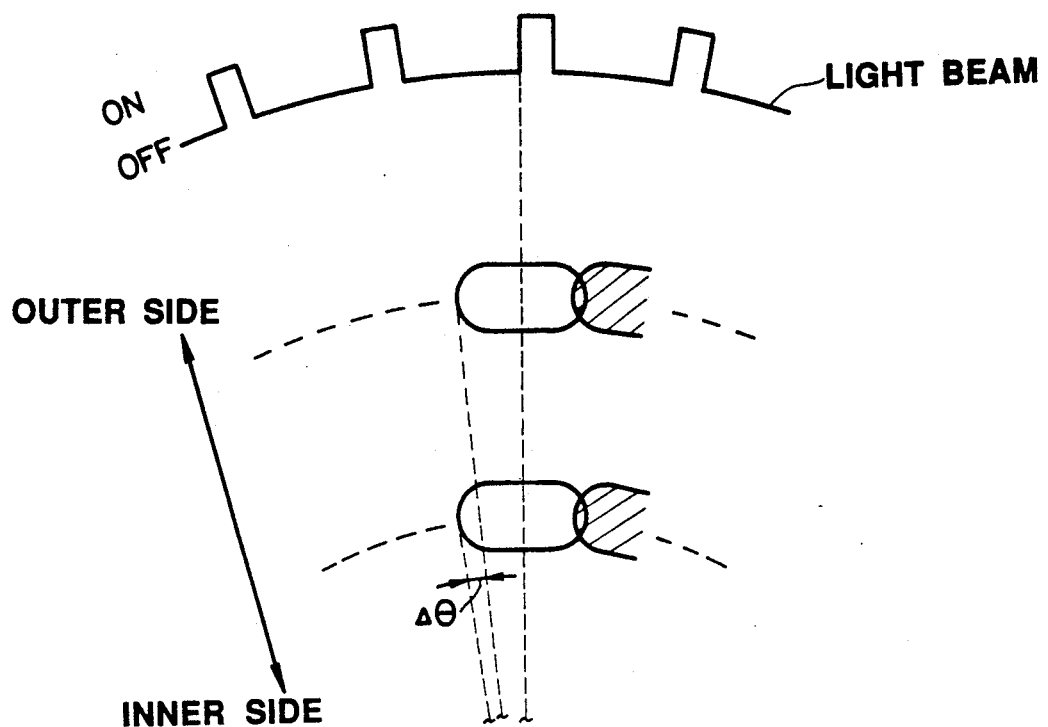
FIG. 9 is a diagrammatic view for illustrating changes in the magnetized domain forming position in the second embodiment.

Hence, as shown in FIG. 9, the position of formation of the magnetized domain P is changed from the correct formation position by the time period by which the rise time $T_U$ is reduced on the inner periphery of the disk. In this case, the phase of the reproduced signal $S_{RF}$ is advanced by a phase difference $\Delta\theta$.

Generally, in the second embodiment, the modulating magnetic field $H_M$ is delayed depending on a particular magneto-optical disk 2 to prevent changes in the magnetized domain formation position otherwise caused with the magnetic and temperature characteristics of the magneto-optical disk 2. On the other hand, the intensity or volume of the light beam $LA_1$ is controlled as a function of the ambient temperature of the magneto-optical disk 2 and the sweeping position of the light spot to prevent changes in the magnetized domain formation position that would otherwise be caused by the above changes in the ambient temperature $T_{ENV}$ and the sweeping position of the light spot.

In the event of a larger irradiation time $T_W$ or irradiation intensity $W_P$ of the light beam $LA_1$, it is necessary to change the delay quantity of the modulating magnetic field as a function of the control quantity.

Figure 10:
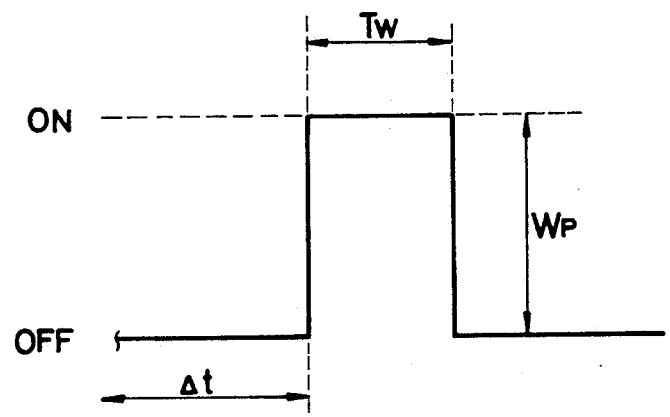
FIG. 10 is a timing chart showing the state of light beam irradiation in the above second embodiment.
Figure 11:
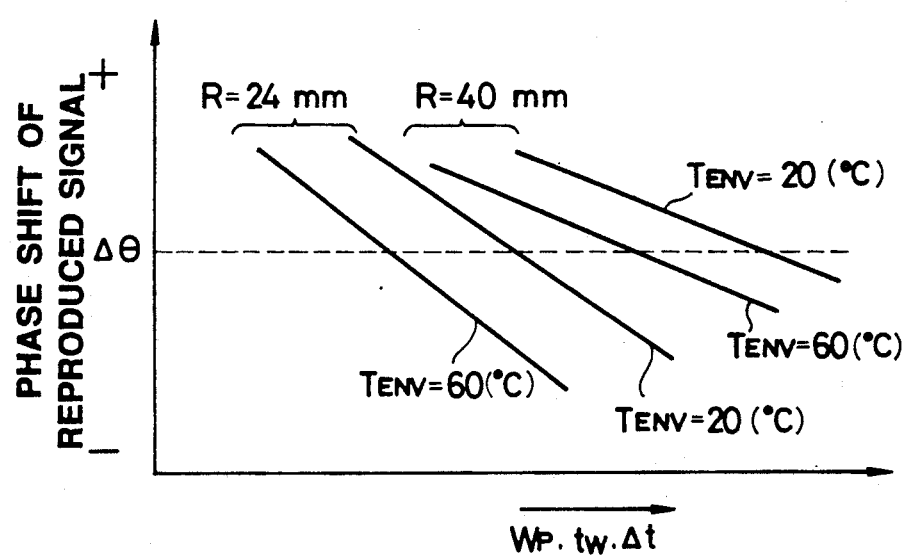
FIG. 11 shows a characteristic curve showing the state of phase shift or deviation in the above second embodiment.

Thus, as shown in FIGS. 10 and 11, the irradiation timing of the light beam $LA_1$, represented by delay time $\Delta t$ from the reference clock signal $S_{CK}$, is retarded on the inner periphery to maintain the correct magnetized domain formation positions at the inner and outer peripheries of the disk and thereby prevent phase shift of the reproduced signal.

Similarly, the irradiation time period $T_W$ of the light beam $LA_1$ may be shortened at the inner periphery to prolong the rise time $T_U$ to prevent the phase shift of the reproduced signal $S_{RF}$.

In addition, the irradiation strength $W_P$ or the light beam $LA_1$ may be reduced on the inner periphery to prolong the rise time $T_U$ to prevent the phase shift of the reproduced signal $S_{RF}$.

Thus, in the present embodiment, among the irradiation timing $T_W$ and the irradiation strength $W_P$ of the light beam $LA_1$ are controlled to maintain the correct magnetized domain formation position.

In the present second embodiment, the same parts as those of the above described first embodiment are indicated as in FIG. 7 and the detailed description thereof is omitted.

With the magneto-optical recording apparatus 30 of the present second embodiment, a position detection circuit 31 is constituted by a potentiometer having its resistance changed as a function of the position of the recording and/or reproducing head movable radially of the magneto-optical disk 2 (that is, an irradiating optical system for the light beam $LA_1$ including the semiconductor laser element 8, the collimator lens 9, light polarizing beam splitter 10 and the objective lens 11, a light receiving optical system for receiving the reflected light beam including the condenser lens 12 and the photo detector 13, and the magnetic head 21 as a whole). The sweeping position of the light spot is sensed by the position detection circuit 31 and outputted to a control circuit 32.

A temperature detection circuit 33 detects the temperature in the vicinity of the magneto-optical disk 2 to detect the temperature of the disk 2 and outputs the detected results to the control circuit 32.

The control circuit 32 receives data concerning magnetic and temperature characteristics of the magneto-optical disk 2 and, based on these data, controls the operation of the laser driving circuit 7, the delay circuit 19 and the head driving circuit 20 to prevent changes in the magnetized domain formation position otherwise caused by the above mentioned magnetic and temperature characteristics.

It should be noted that the above mentioned control circuit 32 controls not only the head driving circuit 20 but also the delay circuit 19 for the modulating magnetic field to orient the irradiated region of the light beam $LA_1$ with the intensity higher than that of the necessary magnetic field $H_H$.

It should be noted further that the above mentioned control circuit 32 controls the time period $T_W$ of irradiation of the light beam $LA_1$ and the intensity of irradiation $W_P$ of the light beam $LA_1$, as a function of the results of detection obtained at the position detection circuit 31 and the temperature detection circuit 33 to permit the magnetized domain to be formed at the correct position.

Thus, with the magneto-optical recording apparatus of the present embodiment, the magnetized domain can be formed at the correct position, even when the ambient temperature $T_{ENV}$ of the magneto-optical disk 2 is changed, so that a markedly broader range of the working temperature of the magneto-optical recording apparatus may be achieved.

Moreover, since the magnetized domain can be formed at the correct position even if the sweeping position of the light spot is changed, the recording capacity of the magneto-optical disk 2 may be increased correspondingly.

Meanwhile, by controlling the irradiation time $T_W$ and the irradiation intensity $W_P$ of the light beam $LA_1$ in this manner, not only can the magnetized domain formation position be kept at the correct position, but the extent of the magnetized domain in the transverse direction, that is, in the direction towards the neighboring track, can be kept at a predetermined size.

With the magneto-optical recording apparatus 30 of the present second embodiment, the irradiation time $T_W$ and the irradiation intensity $W_P$ of the light beam $LA_1$ are controlled as a function of the detected temperature of the magneto-optical disk 2 to permit the magnetized domain to be formed at the correct position despite changes in the temperature of the magneto-optical disk 2.

Moreover, the sweeping position of the light spot is detected and the irradiation time $T_W$ and the irradiation intensity $W_P$ of the light beam $LA_1$ are controlled on the basis of the results of detection to permit the magnetized domain to be formed at the correct position despite changes in the sweeping position of the light spot.

In the above embodiments, description has been made of the case in which the delay time of the delay circuit 19 and the amplification factor of the head driving circuit 20 are variably controlled on the basis of data of magnetic and temperature characteristics recorded on the control track of the magneto-optical disk. The present invention may however be applied to the case of inputting data of the magnetic and temperature characteristics via other input means or the case of presetting the specific delay time and the amplification factor for the particular magneto-optical disk mounted on the magneto-optical recording apparatus, on the condition that the delay time and the amplification factor are set as a function of the magnetic and temperature characteristics of the magneto-optical disk.

In the above described embodiments, not only the delay time of the delay circuit 19 but the amplification factor of the head driving circuit 20 is controlled variably. However, solely the delay time may be caused to be variable on the condition that the intensity of the modulating magnetic field is obtained within a practically sufficient range. In such case, it suffices to record only the temperature characteristics of the magneto-optical disk on the control track.

Also, in the above embodiments, description has been made of the case in which time data until the temperature rises to the Curie temperature Tc, peak temperature data and time data until the temperature falls to the Curie temperature, are recorded as the data of the temperature characteristics of the magneto-optical disk 2. However, the temperature characteristics may not be limited thereto and include data of the temperature characteristics such as the rise time or the hold time.

In the above second embodiment, description has been made of the case of detecting the sweeping position of the light spot with the use of a potentiometer. However, the detection means of the sweeping position is not limited thereto, but the sweeping position of the light spot may also be detected on the basis of the address data of the recording tracks.

In addition, in the above second embodiment, description has been made of the case of controlling the irradiation time $T_W$ and the irradiation intensity among the irradiation timing, the irradiation time $T_W$ and the irradiation intensity $W_P$ of the light beam $LA_1$. However, the present invention is not limited thereto, but it is also possible to control one or two or more of the irradiation timing, irradiation time $T_W$ and the irradiation intensity $W_P$ of the light beam $LA_1$.

In the above second embodiment, description has been made of the case in which the modulating magnetic field $H_M$ is delayed with the particular magneto-optical disk 2 and the light beam $LA_1$ is controlled as a function of the sweeping position of the light spot and the temperature of the magneto-optical disk 2. However, the present invention is not limited thereto, but may be extensively applied to the case in which delay means for the modulating magnetic field $H_M$ is omitted or in which the light beam $LA_1$ is controlled as a function of one of the temperature of the magneto-optical disk 2 or the sweeping position of the light spot.

Although illustrative embodiments of the present invention, and various modifications thereof have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A magneto-optical recording apparatus for recording information onto a magneto-optical recording medium, comprising:
   optical head means movable relative to said recording medium and including light generating means for directing a light beam to said recording medium for forming a light beam spot on said recording medium which scans the recoding medium and thereby causes irradiating of said recording medium where said light beam spot scans the recording medium, and detection means for detecting light reflected from said recording medium at said light beam spot;
   clock signal generating means responsive to said detection means for generating a predetermined reference clock signal supplied to said light generating means which responds to said reference clock signal for causing said light generating means to intermittently produce said light beam in a pulse driving mode thereof so that said light beam spot is then intermittently produced and results in irradiated areas disposed one after the other on said recording medium at a timing determined by said reference clock signal;
   magnetic field generating means for generating a magnetic field having a magnetic polarity and acting on said recording medium at a location on said recording medium which is adjacent to said light beam spot;
   magnetic field modulating means receiving said reference clock signal and information data to be recorded for providing a record signal which undergoes reversal of amplitude polarity in timed relation to said reference clock signal and which represents said information data;
   delay means through which said record signal is supplied to said magnetic field generating means for causing reversal of said magnetic polarity of said magnetic field in accordance with each reversal of amplitude polarity of said record signal, and which has a variable delay time; and
   control means for providing a control signal corresponding to at least one of magnetic and temperature characteristics of said recording medium and which is applied to said delay means for varying said delay time and thereby controlling timing of said reversal of the magnetic polarity of the magnetic field relative to said reference clock signal.

2. A magneto-optical recording apparatus according to claim 1; in which said magnetic field generating means includes drive circuit means having a variable amplification factor, and said control signal is further applied to said drive circuit means for varying said amplification factor in accordance with at least one of said magnetic and temperature characteristics of the recording medium.

3. A magneto-optical recording apparatus according to claim 1; in which said recording medium has spaced apart servo regions on which servo patterns are formed for scanning by said light beam spot, said control means is responsive to said detection means for providing a second control signal to said light generating means for causing said light generating means to continuously produce said light beam when said light beam spot is scanning said servo regions, and said clock signal generating means provides said reference clock signal on the basis of the reflected light detected by said detecting means when said light beam spot is scanning said servo patterns on said servo regions.

4. A magneto-optical recording apparatus according to claim 1; in which said recording medium has a control track in which there are recorded data indicating at least one of said magnetic and temperature characteristics of said recording medium; and in which said control means responds to said detection means for providing said control signal when said light beam spot scans said control track.

5. A magneto-optical recording apparatus according to claim 1; further comprising temperature sensing means positioned near said recording medium for detecting the ambient temperature thereof and providing a temperature indicating signal to said control means; and wherein said control means provides a second control signal to said light generating means in response to said temperature indicating signal for correspondingly controlling the amount of light in each said light beam spot produced in said pulse driving mode.

6. A magneto-optical recording apparatus according to claim 5; in which said second control signal controls the intensity of the intermittently produced light beam.

7. A magneto-optical recording apparatus according to claim 5; in which said second control signal controls the duration of the intermittently produced light beam.

8. A magneto-optical recording apparatus according to claim 5; in which said recording medium is a record disk which is rotated, and said optical head means is moved along a radial direction of the record disk for varying the radial position on the rotated record disk at which said light beam spot formed by said light generating means scans said record disk and further comprising position sensing means for detecting said radial position and providing a position indicating signal to said control means for correspondingly influencing said second control signal.

9. A magneto-optical recording apparatus according to claim 1; in which said recording medium is a record disk which is rotated, and said optical head means is moved along a radial direction of said record disk for varying the radial position on the rotated record disk at which said light beam spot formed by said light generating means scans said record disk; and further comprising position sensing means for detecting said radial position and providing a position indicating signal to said control means, and means in said control means providing a second control signal to said light generating means in response to said position indicating signal for correspondingly controlling the amount of light in each said light beam spot produced in said pulse driving mode.

* * * * *